(12) United States Patent
Nádas et al.

(10) Patent No.: US 10,911,348 B2
(45) Date of Patent: Feb. 2, 2021

(54) TRANSMISSION OF GUARANTEED AND NON-GUARANTEED DATA PACKETS ON REDUNDANT LINKS

(71) Applicant: Telefonaktiebolaget LM Ericsson (publ), Stockholm (SE)

(72) Inventors: Szilveszter Nádas, Budapest (HU); János Farkas, Kecskemét (HU); Balázs Varga, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 16/342,246

(22) PCT Filed: Nov. 7, 2016

(86) PCT No.: PCT/EP2016/076815
§ 371 (c)(1),
(2) Date: Apr. 16, 2019

(87) PCT Pub. No.: WO2018/082787
PCT Pub. Date: May 11, 2018

(65) Prior Publication Data
US 2019/0253342 A1    Aug. 15, 2019

(51) Int. Cl.
*H04L 12/707* (2013.01)
*H04L 1/08* (2006.01)
(Continued)

(52) U.S. Cl.
CPC ............... *H04L 45/24* (2013.01); *H04L 1/08* (2013.01); *H04L 43/0847* (2013.01);
(Continued)

(58) Field of Classification Search
CPC ....... H04L 45/24; H04L 1/08; H04L 43/0847; H04L 47/2441; H04L 47/6225
See application file for complete search history.

(56) References Cited

U.S. PATENT DOCUMENTS 6,067,298 A * 5/2000 Shinohara ............... H04L 12/28
2006/0140186 A1* 6/2006 LoGalbo .................. H04H 1/00
(Continued)

OTHER PUBLICATIONS

International Search Report and Written Opinion of the International Searching Authority, PCT/EP2016/076815, dated Aug. 21, 2017, 16 pages.
(Continued)

*Primary Examiner* — Ronald B Abelson
(74) *Attorney, Agent, or Firm* — Sage Patent Group

(57) ABSTRACT

A node classifies data packets into different classes and replicates the data packets according to a number of redundant links configured for transmission of the data packets to obtain, for each of the redundant links, a redundant version of the data packets. For a first one of the classes, the node marks all redundant versions of the data packets with a first indication that the data packet is a guaranteed data packet. For a second one of the classes, the node marks at least one of the redundant versions of the data packets with a second indication that the data packet is a guaranteed data packet and marks at least one other of the redundant versions of the data packets with a third indication that the data packet is a non-guaranteed data packet.

17 Claims, 12 Drawing Sheets

(51) Int. Cl.
  *H04L 12/26*  (2006.01)
  *H04L 12/851*  (2013.01)
  *H04L 12/863*  (2013.01)
(52) U.S. Cl.
  CPC ...... *H04L 47/2441* (2013.01); *H04L 47/6225* (2013.01); *H04L 47/24* (2013.01)

(56) References Cited

U.S. PATENT DOCUMENTS

2009/0201803 A1\* 8/2009 Filsfils .................... G06F 11/07
2011/0274109 A1\* 11/2011 Stevens .................. H04L 12/56
2016/0007228 A1\* 1/2016 Soriaga ................. H04W 28/02

OTHER PUBLICATIONS

Time-Sensitive Networking Task Group of IEEE 802.1 of the LAN MAN Standards Committee of the IEEE Computer Society, Draft Standard for Local and metropolitan area networks—Frame Replication and Elimination for Reliability, IEEE P802.1CB/D2.6, Piscataway, NJ, USA, XP068109813, Sep. 12, 2016, 98 Pages.

Mark Karol et al., VoIP Protection and Performance Improvement, Telecommunications Systems, XP019215879, Mar. 1, 2005, pp. 351-367.

Szilveszter Nadas et al., Further SRS Considerations and Application of SRS to TSN use cases, XP068111567, Dec. 12, 2016, pp. 1-12.

\* cited by examiner

US 10,911,348 B2

TRANSMISSION OF GUARANTEED AND NON-GUARANTEED DATA PACKETS ON REDUNDANT LINKS

CROSS REFERENCE TO RELATED APPLICATIONS

This application is a 35 U.S.C. § 371 national stage application of PCT International Application No. PCT/EP2016/076815 filed on Nov. 7, 2016, the disclosure and content of which is incorporated by reference herein in its entirety.

TECHNICAL FIELD

The present invention relates to methods for handling data traffic in a data network and to corresponding devices and systems.

BACKGROUND

In communication networks, e.g., based on the Internet Protocol (IP) and the Transmission Control Protocol (TCP), various kinds of data traffic are transferred. Such different kinds data traffic may differ with respect to their sensitivity concerning delay which occurs while data packets of the data traffic are forwarded through the communication network, e.g., in terms of a per-hop delay or an end-to-end delay. For example, for data packets of a file download the delay of the data packets is typically not very relevant. However, in the case of realtime data transfers, such as multimedia streaming, excessive delay of a data packet may adversely impact the user experience because typically data packets need to be available at the receiver at a certain time, and later received data packets are useless. Further, certain types of traffic may also be loss-sensitive, so that it may be desirable to control the forwarding of the data packets in such a way that dropping of data packets in avoided as far as possible.

One way to improve reliability and avoid losses of data packets is replication of packets for redundant transmission on multiple redundant links, as for example proposed in IEEE P802.1CB™/D2.6, Draft Standard for local and metropolitan area networks entitled "Frame Replication and Elimination for Reliability" (August 2016). However, in this case it is not straightforward to efficiently avoid congestion losses of data packets while at the same time also avoiding excessive delay of the data packets.

Accordingly, there is a need for techniques which allow for efficiently transmitting data traffic on multiple redundant links.

SUMMARY

According to an embodiment of the invention, a method of handling data traffic in a data network is provided. According to the method, a node of the data network classifies the data packets into multiple different classes. Further, the node replicates the data packets according to a number of redundant links configured for transmission of the data packets to obtain, for each of the redundant links, a redundant version of the data packets. For a first one of the classes, the node marks all redundant versions of the data packets with a first indication that the data packet is a guaranteed data packet which is subject to a guarantee that the data packet is not dropped and not delayed by more than a certain delay limit. For a second one of the classes, the node marks at least one of the redundant versions of the data packets with a second indication that the data packet is a guaranteed data packet which is subject to the guarantee and marks at least one other of the redundant versions of the data packets of with a third indication that the data packet is a non-guaranteed data packet which is not subject to the guarantee.

According to a further embodiment of the invention, a method of handling data traffic in a data network is provided. According to the method, a node of the data network configures multiple redundant links for transmission of data packets. The data packets are classified into data packets of multiple different classes, and the data packets are replicated to obtain, for each of the redundant links, a redundant version of the data packets. For each of the redundant links, the node configures a corresponding resource contingent based on a worst case calculation of a delay experienced by a data packet on the redundant link. For a first one of the classes all redundant versions of the data packets are marked with a first indication that the data packet is a guaranteed data packet which is subject to a guarantee that the data packet is not dropped and not delayed by more than a certain delay limit. For a second one of the classes, at least one of the redundant versions of the data packets is marked with a second indication that the data packet is a guaranteed data packet which is subject to the guarantee while at least one other of the redundant versions of the data packets is marked with a third indication that the data packet is a non-guaranteed data packet which is not subject to the guarantee. For each of the redundant links, the node configures the resource contingent with a maximum amount of resources which is more than a minimum amount of resources required to meet the guarantee. On each of the redundant links, the non-guaranteed data packets are forwarded based on excess resources in excess of the minimum amount required to meet the guarantee.

According to a further embodiment of the invention, a method of handling data traffic in a data network is provided. According to the method, a node of the data network receives data packets from multiple redundant links. The data packets are classified into data packets of multiple different classes, and the data packets are replicated to obtain, for each of the redundant links, a redundant version of the data packets. Among the data packets received from the multiple redundant links, the node discards replicated versions of previously received data packets. For a first one of the classes all redundant versions of the data packets are marked with a first indication that the data packet is a guaranteed data packet which is subject to a guarantee that the data packet is not dropped and not delayed by more than a certain delay limit. For a second one of the classes, at least one of the redundant versions of the data packets is marked with a second indication that the data packet is a guaranteed data packet which is subject to the guarantee while at least one other of the redundant versions of the data packets is marked with a third indication that the data packet is a non-guaranteed data packet which is not subject to the guarantee. By monitoring the data packets marked with the first indication, the node detects errors in the transmission of the data packets on the multiple redundant links.

According to a further embodiment of the invention, a node for a data network is provided. The node is configured to classify data packets into multiple different classes. Further, the node is configured to replicate the data packets according to a number of redundant links configured for transmission of the data packets to obtain, for each of the redundant links, a redundant version of the data packets of each class. For a first one of the classes, the node is configured to mark all redundant versions of the data packets with a first indication that the data packet is a guaranteed data packet which is subject to a guarantee that the data packet is not dropped and not delayed by more than a certain delay limit. For a second one of the classes, the node is configured to mark at least one of the redundant versions of the data packets with a second indication that the data packet is a guaranteed data packet which is subject to the guarantee and to mark at least one other of the redundant versions of the data packets with a third indication that the data packet is a non-guaranteed data packet which is not subject to the guarantee.

According to a further embodiment of the invention, a node for a data network is provided. The node is configured to configure multiple redundant links for transmission of data packets. The data packets are classified into data packets of multiple different classes and are replicated to obtain, for each of the redundant links, a redundant version of the data packets. For a first one of the classes all redundant versions of the data packets are marked with a first indication that the data packet is a guaranteed data packet which is subject to a guarantee that the data packet is not dropped and not delayed by more than a certain delay limit. For a second one of the classes, at least one of the redundant versions of the data packets is marked with a second indication that the data packet is a guaranteed data packet which is subject to the guarantee while at least one other of the redundant versions of the data packets is marked with a third indication that the data packet is a non-guaranteed data packet which is not subject to the guarantee. For each of the redundant links, the node is configured to configure a corresponding resource contingent based on a worst case calculation of a delay experienced by a data packet on the redundant link. For each of the redundant links the node is configured to configure the resource contingent with a maximum amount of resources which is more than a minimum amount of resources required to meet the guarantee. On each of the redundant links the non-guaranteed data packets are forwarded based on excess resources in excess of the minimum amount required to meet the guarantee.

According to a further embodiment of the invention, a node for a data network is provided. The node is configured to receive data packets from multiple redundant links. The data packets are classified into multiple different classes and are replicated to obtain, for each of the redundant links, a redundant version of the data packets. Further, the node is configured to discard, among the data packets received from the multiple redundant links, replicated versions of previously received data packets. For a first one of the classes all redundant versions of the data packets are marked with a first indication that the data packet is a guaranteed data packet which is subject to a guarantee that the data packet is not dropped and not delayed by more than a certain delay limit. For a second one of the classes, at least one of the redundant versions of the data packets is marked with a second indication that the data packet is a guaranteed data packet which is subject to the guarantee while at least one other of the redundant versions of the data packets is marked with a third indication that the data packet is a non-guaranteed data packet which is not subject to the guarantee. The node is further configured to detect errors in the transmission of the data packets on the multiple redundant links by monitoring the data packets marked with the first indication.

According to a further embodiment of the invention, a system is provided. The system comprises at least a first node and a second node of a data network. The first node is configured to classify data packets into multiple different classes, to replicate the data packets according to a number of redundant links configured for transmission of the data packets to obtain, for each of the redundant links, a redundant version of the data packets; for a first one of the classes, mark all redundant versions of the data packets with a first indication that the data packet is a guaranteed data packet which is subject to a guarantee that the data packet is not dropped and not delayed by more than a certain delay limit; and for a second one of the classes, mark at least one of the redundant versions of the data packets with a second indication that the data packet is a guaranteed data packet which is subject to the guarantee and mark at least one other of the redundant versions of the data packets with a third indication that the data packet is a non-guaranteed data packet which is not subject to the guarantee. The second node is configured to receive the data packets from the multiple redundant links; among the data packets received from the multiple redundant links, discard replicated versions of previously received data packets; and by monitoring the data packets marked with the first indication wherein, detect errors in the transmission of the data packets on the multiple redundant links. The system may further comprise a third node of the data network, the third node being configured to configure the—configure the multiple redundant links for transmission of data packets; and for each of the redundant links, configure a corresponding resource contingent based on a worst case calculation of a delay experienced by a data packet on the redundant link, for each of the redundant links the resource contingent being configured with a maximum amount of resources which is more than a minimum amount of resources required to meet the guarantee. On each of the redundant links the non-guaranteed data packets are forwarded based on excess resources in excess of the minimum amount required to meet the guarantee.

According to a further embodiment of the invention, a computer program or computer program product is provided, e.g., in the form of a non-transitory storage medium, which comprises program code to be executed by at least one processor of an node for a data network. Execution of the program code causes the node to classify data packets into multiple different classes. Further, execution of the program code causes the node to replicate the data packets according to a number of redundant links configured for transmission of the data packets to obtain, for each of the redundant links, a redundant version of the data packets. For a first one of the classes, execution of the program code causes the node to mark all redundant versions of the data packets with a first indication that the data packet is a guaranteed data packet which is subject to a guarantee that the data packet is not dropped and not delayed by more than a certain delay limit. For a second one of the classes, execution of the program code causes the node to mark at least one of the redundant versions of the data packets of with a second indication that the data packet is a guaranteed data packet which is subject to the guarantee and to mark at least one other of the redundant versions of the data packets with a third indication that the data packet is a non-guaranteed data packet which is not subject to the guarantee.

According to a further embodiment of the invention, a computer program or computer program product is provided, e.g., in the form of a non-transitory storage medium, which comprises program code to be executed by at least one processor of an node for a data network. Execution of the program code causes the node to configure multiple redundant links for transmission of data packets. The data packets are classified into data packets of multiple different classes and are replicated to obtain, for each of the redundant links, a redundant version of the data packets. For a first one of the classes all redundant versions of the data packets are marked with a first indication that the data packet is a guaranteed data packet which is subject to a guarantee that the data packet is not dropped and not delayed by more than a certain delay limit. For a second one of the classes, at least one of the redundant versions of the data packets is marked with a second indication that the data packet is a guaranteed data packet which is subject to the guarantee while at least one other of the redundant versions of the data packets is marked with a third indication that the data packet is a non-guaranteed data packet which is not subject to the guarantee. For each of the redundant links, execution of the program code causes the node to configure a corresponding resource contingent based on a worst case calculation of a delay experienced by a data packet on the redundant link. For each of the redundant links, execution of the program code causes the node to configure the resource contingent with a maximum amount of resources which is more than a minimum amount of resources required to meet the guarantee. On each of the redundant links the non-guaranteed data packets are forwarded based on excess resources in excess of the minimum amount required to meet the guarantee.

According to a further embodiment of the invention, a computer program or computer program product is provided, e.g., in the form of a non-transitory storage medium, which comprises program code to be executed by at least one processor of an node for a data network. Execution of the program code causes the node to receive data packets from multiple redundant links. The data packets are classified into multiple different classes and are replicated to obtain, for each of the redundant links, a redundant version of the data packets. Further, execution of the program code causes the node to discard, among the data packets received from the multiple redundant links, replicated versions of previously received data packets. For a first one of the classes all redundant versions of the data packets are marked with a first indication that the data packet is a guaranteed data packet which is subject to a guarantee that the data packet is not dropped and not delayed by more than a certain delay limit. For a second one of the classes, at least one of the redundant versions of the data packets is marked with a second indication that the data packet is a guaranteed data packet which is subject to the guarantee while at least one other of the redundant versions of the data packets is marked with a third indication that the data packet is a non-guaranteed data packet which is not subject to the guarantee. Further, execution of the program code causes the node to detect errors in the transmission of the data packets on the multiple redundant links by monitoring the data packets marked with the first indication.

Details of such embodiments and further embodiments will be apparent from the following detailed description of embodiments.

DETAILED DESCRIPTION OF EMBODIMENTS

In the following, concepts according to embodiments of the invention will be explained in more detail by referring to the accompanying drawings. The illustrated concepts relate to handling data traffic in a data network. Specifically, the concepts relate to controlling forwarding of data packets of the data traffic by a node of such data network. The data network may for example be part of a communication network. One example of such communication network is a wireless communication network, e.g., based on GSM (Global System for Mobile Communication), UMTS (Universal Mobile Telecommunications System), or LTE (Long Term Evolution) technologies specified by 3GPP ($3^{rd}$ Generation Partnership Project). For example, the data network implement be a transport network part of such wireless communication network. However, the concepts could also be applied in other types of communication systems or data networks. The data packets may be IP data packets, optionally in connection with further protocols, e.g., an Ethernet framing protocol, TCP, UDP (User Datagram Protocol), or a tunneling protocol such as GTP (General Packet Radio Service Tunneling Protocol).

Figure 1:
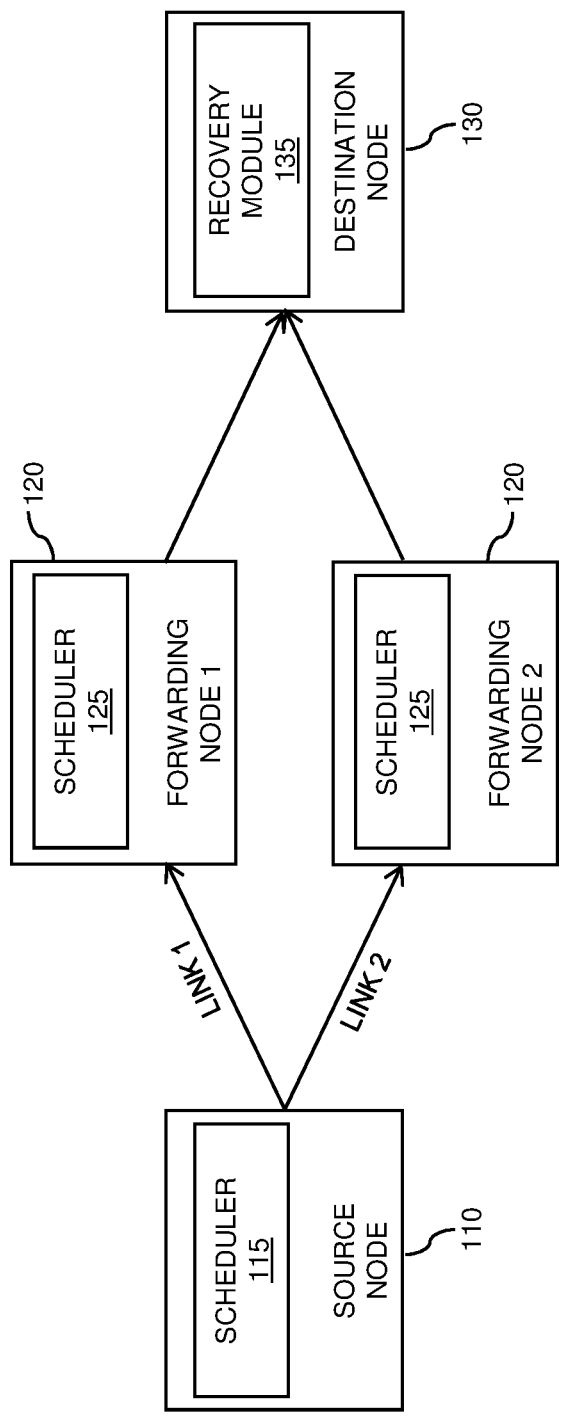
FIG. 1 schematically illustrates a scenario in which data traffic is handled according to an embodiment of the invention.

In the concepts as illustrated in the following, data traffic is forwarded on multiple redundant links. An example of a corresponding scenario is illustrated in FIG. 1, where data traffic provided by a source node 110 is forwarded via two redundant links (designated as LINK 1 and LINK 2) established through different forwarding nodes 120 to a destination node 130.

The data traffic may include multiple flows. For example, in the case of data traffic based on IP data packets, the packets of the same flow may carry the same source address and the same destination address.

The source node 110 replicates the data packets for the transmission on the redundant links. In the illustrated scenario with two redundant links this means that the source node 110 generates two replicated versions of each data packet, one for transmission on one of the redundant links, and the other for transmission on the other redundant link.

The replication based transmission on the redundant links may for example be based on the mechanisms as defined in IEEE P802.1CB™/D2.6, Draft Standard for local and metropolitan area networks entitled "Frame Replication and Elimination for Reliability" (August 2016).

In the transmission of the data traffic over the redundant links, data packets of the data traffic may be treated either as guaranteed data packets or a non-guaranteed data packets. The guaranteed data packets are subject to a guarantee that the transmitted data packet is not delayed by more than a certain delay limit and not dropped. For the non-guaranteed data packets this guarantee does not apply, i.e., the non-guaranteed data packets may be dropped. However, the non-guaranteed data packets may nonetheless benefit from the delay limit as defined for the guaranteed data packets. That is to say, if a non-guaranteed data packet is not dropped, can be transmitted within the same delay limit as guaranteed for the guaranteed data packets.

Transmission of the data traffic by the source node 110 is managed by a scheduler 115 of the source node 110. Similarly, the transmission of the data traffic by the forwarding nodes 120 is managed by respective schedulers 125 of the forwarding nodes. The schedulers 115, 125 operates on the basis of a scheduling algorithm which enables to meet the guarantee for the guaranteed data packets on each of the redundant links. For this purpose, the scheduling algorithm reserves one or more resource contingents which are filled with sufficient resources to meet the guarantee. By way of example, the resource contingent(s) may be managed on the basis of one or more token buckets and filling rate of the token bucket(s) and size of the token bucket(s) be set in such a way that the guarantee is met. This is accomplished on the basis of a worst case calculation for the delay experienced by a transmitted data packets, e.g., a delay as experienced by a data packet while being transmitted from the source node 110 to the destination node 130.

Due to the replication of the data packets and transmission of the replicated versions of the data packets on the redundant links, the risk of packet losses may be significantly reduced. In particular, even if the replicated version of a data packet would be lost on one of the redundant links, the corresponding replicated version could still be successfully transmitted on the other redundant link. Since typical situations most of the replicated versions would be successfully transmitted on both redundant links, the destination node 130 is provided with a recovery module 135 which is responsible for detecting that more than one replicated version of the same data packet was received and to discard all but one of the multiply received versions. For example, upon reception of a data packet by the destination node 130, the recovery module 135 may check if a replicated version of this data packet was already received before and then discard the newly received replicated version. The recovery module 135 may also be responsible for error detection, e.g., by monitoring events in which one or more redundant versions of a data packet are lost.

The worst case calculation may be based on known, estimated, or measured characteristics of the data traffic forwarded by the node, e.g., data rates, maximum size, or burstiness of the data traffic. By way of example, in the case of higher burstiness and/or higher data rate of a certain flow, a larger resource contingent may be needed to meet the guarantee. On the other hand, the maximum size of the resource contingent should be limited because the worst case delay is found to be minimal when the maximum size of the resource contingent is equal to the minimum amount of resources required to meet the guarantee and increases with the maximum size of the resource contingent. This can be attributed to an overall limitation of the available resources. For example, if the amount of reserved resources increases, this means that transmission of more data packets over the same bottleneck (e.g., an interface with limited capacity) is admitted, which typically results in increased worst case delay for transmission of data packets over this bottleneck.

The worst case delay calculation may be based on various models or calculation methods. An example of how the worst case delay can be calculated in a scenario in which multiple token buckets are used for providing a delay guarantee for multiple flows is given in "Urgency-Based Scheduler for Time-Sensitive Switched Ethernet Networks" by J. Specht and Soheil Samii, 28th Euromicro Conference on Real-Time Systems (ECRTS), Toulouse, France, Jul. 5-8, 2016.

In the illustrated examples, the maximum size of the resource contingent(s) may be intentionally set to be larger than a minimum size needed to meet the guarantee. This increased size of the resource contingent(s) is considered in the worst-case delay calculation. In this way, the resource contingent may include resources in excess of the minimum amount required to meet the guarantee, in the following referred to as excess resources. The scheduler 115, 125 may then use the excess resources for forwarding non-guaranteed data packets. In particular, if sufficient excess resources are present, the scheduler 115, 125 may use these excess resources for forwarding one or more non-guaranteed data packet. If no sufficient excess resources are present, the scheduler 115, 125 may decide to drop the non-guaranteed data packet. Accordingly, resources not used for forwarding the guaranteed data packets can be efficiently used for forwarding the non-guaranteed data packets.

It is noted that the elements of FIG. 1 are merely illustrative and that the data network may include additional nodes and that various connection topologies are possible in such data communication network. For example, such additional nodes could be intermediate nodes between the source node 110 and the forwarding nodes 120 or intermediate nodes between the forwarding nodes 120 and the destination node 130. Such intermediate nodes could forward the data traffic in a similar manner as the forwarding nodes 120. As further explained below, it is also possible to configure more than two redundant links between the source node 110 and the destination node 130.

The distinction between the guaranteed data packets and the non-guaranteed data packets may be based on a marking of the data packets with a value, in the following referred to as per packet value (PPV). An example of how this may be accomplished is illustrated in FIG. 2A.

Figure 2A:
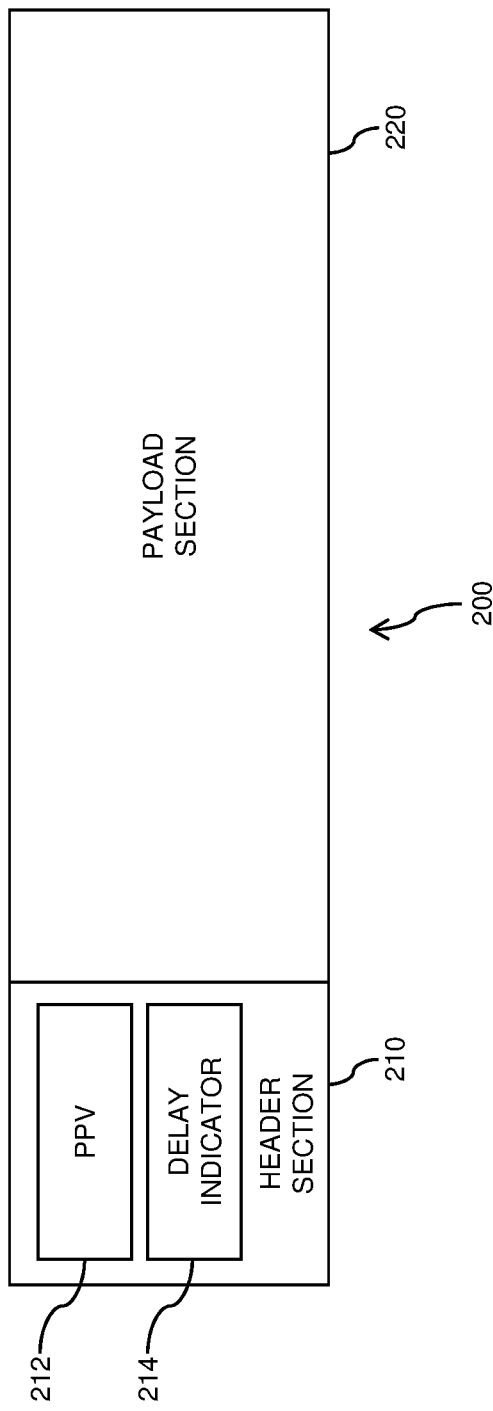
FIG. 2A schematically an example of a data packet as utilized in an embodiment of the invention.

FIG. 2A shows an exemplary data packet 200. The data packet may be an IP data packet. Further, the data packet 200 may be based on various kinds of additional protocols, e.g., a transport protocol such as TCP or UDP, or a tunnelling protocol such as GTP. As illustrated, the data packet 200 includes a header section 210 and a payload section 220. The payload section 220 may for example include user data. If a tunnelling protocol is utilized, the payload section 220 may also include one or more encapsulated data packets. The header section 210 typically includes various kinds of information which is needed for propagation of the data packet 200 through the data communication system. For example, such information may include a destination address and/or source address.

As further illustrated, the header section 210 includes a label 212 indicating the PPV. The label 212 may include a scalar value, e.g., in the range of 0 to 255, to indicate the PPV. The label 214 may for example be included in a corresponding information fields in the header section 210. For this purpose, a corresponding information field may be defined for the above-mentioned protocols or one or more existing information fields may be reused. As further illustrated, the header section may also include a delay indicator 214. The delay indicator may for example be used for determining a delay class of the data packet. Different delay limits may be defined depending on the delay indicator.

The PPV may represent a level of importance of the data packet, e.g., in terms of a network-level gain when the data packet is delivered. Accordingly, nodes of the data network, including the network node 120, should aim at utilizing their available resources to maximize the total PPV of the successfully transmitted data packets. The PPV may be considered in relation to the number of bits in the data packet, i.e., the value included in the label 212 may be treated as a value per bit, which enables direct comparison of data packets of different sizes. Accordingly, for the same marking in the label 212, a data larger packet may would have a higher PPV than a smaller data packet. On the other hand, transmission of the larger data packet requires more resources than transmission of the shorter data packet. The PPV may be set by an operator of the data network according to various criteria, e.g., by assigning a higher PPV to data traffic of premium users or emergency traffic. Accordingly, the PPV may be used to express the importance of data packets relative to each other, which in turn may be utilized by the nodes 110, 120 (or other nodes of the data network) for controlling how to utilize their available resources for transmission the data packets, e.g., by using resources for forwarding a data packet with high PPV at the expense of a data packet with low PPV, which may then be delayed or even dropped.

For utilizing the PPV for distinguishing between guaranteed data packets and non-guaranteed data packets, a threshold may be defined. Based on a comparison of the PPV to the threshold, the network node 120 can decide whether the data packet is a guaranteed data packet or a non-guaranteed data packet. In particular, if for a given data packet the PPV exceeds the threshold the network node 120 may treat the data packet as a guaranteed data packet. Otherwise, the network node 120 may treat the data packet as a non-guaranteed data packet.

The delay indicator 214 may for example indicate a maximum delay the data packet may experience when being forwarded, e.g., in terms of a per-hop delay or in terms of an end-to-end delay. This information may then be applied by the network node 120 for setting the above-mentioned delay limit of the guarantee.

The scheduler 115, 125 may thus operate by providing the guarantee with respect to loss and delay and using the PPV for deciding whether a certain data packet is to be treated as a guaranteed data packet or as a non-guaranteed data packet. The guaranteed data packets, e.g., the data packets for which the PPV is above the threshold, may then be subjected to traffic shaping. The non-guaranteed packets may be filtered, either before being stored in a queue or when being output from the queue.

Figure 2B:
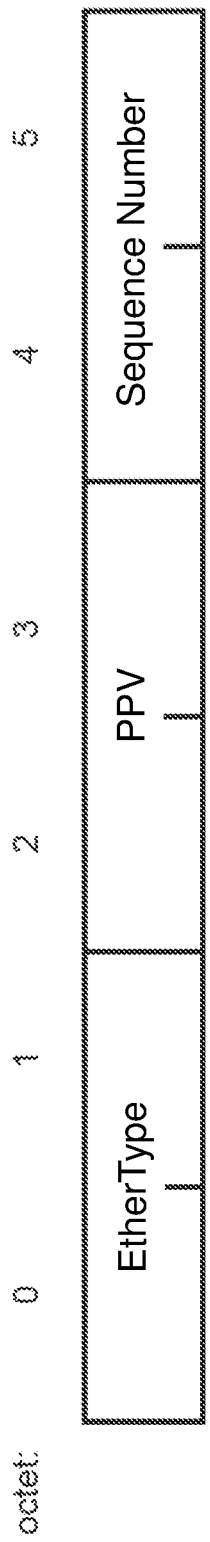
FIG. 2B schematically an example of marking a data packet according to an embodiment of the invention.

If the replication based transmission on the redundant links is based on the mechanisms as defined in IEEE P802.1CB™/D2.6, the PPV may be indicated in the reserved field of redundancy tag information as described in section 7.8 of IEEE P802.1CB™/D2.6. A corresponding structure of the redundancy tag information is illustrated in FIG. 2B. The functionality of marking the data packets with the PPV may be incorporated into the frame replication as described in section 7.2 of IEEE P802.1CB™/D2.6.

Figure 3:
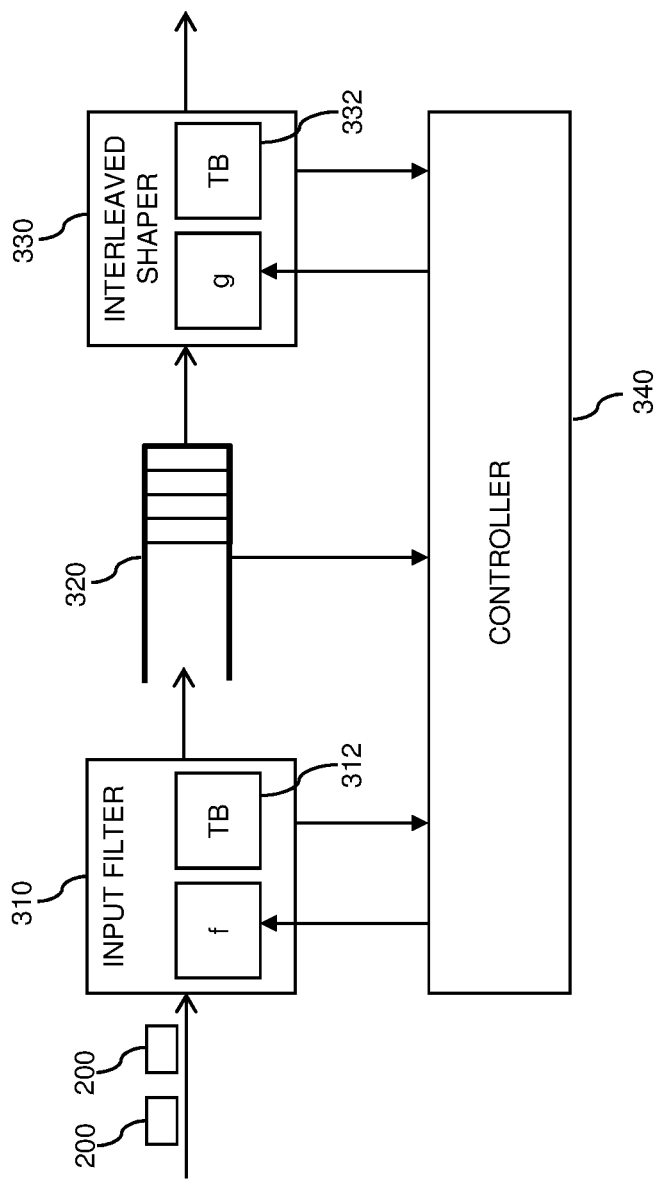
FIG. 3 schematically illustrates an architecture of a scheduler according to an embodiment of the invention.

FIG. 3 schematically illustrates an exemplary architecture which may be used for implementing the transmission of the data packets on one of the redundant links. For example, the architecture of FIG. 3 may be used to implement the above-mentioned scheduler 115, 125.

As illustrated, the architecture of FIG. 3 includes an input filter 310 in which the data packets 200 received by the network node 120 subjected to input filtering. Further, the architecture includes a queue 320 for temporarily storing the data packets 200 passed through the input filter 310, and an interleaved shaper 330 for controlling forwarding of the data packets 200 from the queue 320. Further, the architecture provides a controller 340 which may be used for tuning operation of the input filter 310 and/or of the interleaved shaper 330. For example, the controller may collect statistics from the input filter 310, e.g., an average drop rate, from the queue 320, e.g., a queue length and/or an average queueing time, and/or from the interleaved shaper 330, e.g., an average drop rate or an average delay, and tune the operation of the input filter 310 and/or of the interleaved shaper 330 depending on the collected statistics.

The input filtering by the input filter 310 involves determining for each of the data packets 200 whether the data packet 200 is a guaranteed data packet or a non-guaranteed data packet. The input filter 310 passes the guaranteed data packets to a queue 320. In the case of the non-guaranteed data packets, the input filter 310 can decide between dropping the non-guaranteed data packet 200 or passing the non-guaranteed data packet 200 to the queue 320. This may be accomplished depending on the PPV. Further, the input filter 310 may also decide depending on a resource contingent managed on the basis of a set 312 of one or more token buckets (TB) whether to drop the non-guaranteed data packet 200. This may also consider the size of the non-guaranteed data packet 200. For example, if there are sufficient resources for further processing a non-guaranteed data packet 200 with size L, i.e., if there are sufficient tokens in a token bucket for the size L, the input filter 310 may pass the non-guaranteed data packet 200 to the queue 320. A function $f(PPV, L)$ may be applied for determining the number of tokens required to let the non-guaranteed data packet 200 pass. Here, the number of required tokens will typically increase with increasing size L of the packet, but decrease with increasing packet value V. Accordingly, non-guaranteed data packets 200 with higher packet value have a higher likelihood of being passed to the queue 320. The controller 340 may tune parameters of the function $f(PPV, L)$ depending on the statistics provided by the input filter 310, the queue 320, and/or the interleaved shaper 330.

The interleaved shaper 330 controls forwarding of the data packets 200 from the queue 320. This involves taking the first data packet 200 from the queue 320 and again determining for whether the data packet 200 is a guaranteed data packet or a non-guaranteed data packet. If the data packet 200 is a guaranteed data packet, it is forwarded by the interleaved shaper 330, without delaying it in excess of the delay limit. If the data packet 200 is a non-guaranteed data packet, the interleaved shaper 330 may decide between dropping the non-guaranteed data packet 200 or forwarding the non-guaranteed data packet 200.

The interleaved shaper 330 may utilize a resource contingent managed on the basis of a set 332 of one or more token buckets (TB) whether to drop a non-guaranteed data packet 200 and when to forward a guaranteed data packet 200. This may also consider the size of the data packet 200.

The interleaved shaper 330 forwards a guaranteed data packet 200 when there are sufficient tokens in a corresponding token bucket. The interleaved shaper 330 forwards a non-guaranteed data packet 200 only if there are sufficient excess resources. This may be the case if a token bucket is filled beyond a minimum amount of tokens which is required to meet the delay guarantee. For example, if there are sufficient excess resources for forwarding a non-guaranteed data packet 200 with size L, i.e., if there are sufficient excess tokens in a token bucket for the size L, the interleaved shaper 330 may forward the non-guaranteed data packet 200, using the excess tokens. A function g(PPV, L) may be applied for determining the number of tokens required for forwarding a guaranteed or non-guaranteed data packet 200. Here, the number of required tokens will typically increase with increasing size L of the packet, but decrease with increasing PPV. Accordingly, non-guaranteed data packets 200 with higher PPV have a higher likelihood of being forwarded by the interleaved shaper 330. The controller 340 may tune parameters of the function g(PPV, L) depending on the statistics provided by the input filter 310, the queue 320, and/or the interleaved shaper 330.

Figure 4:
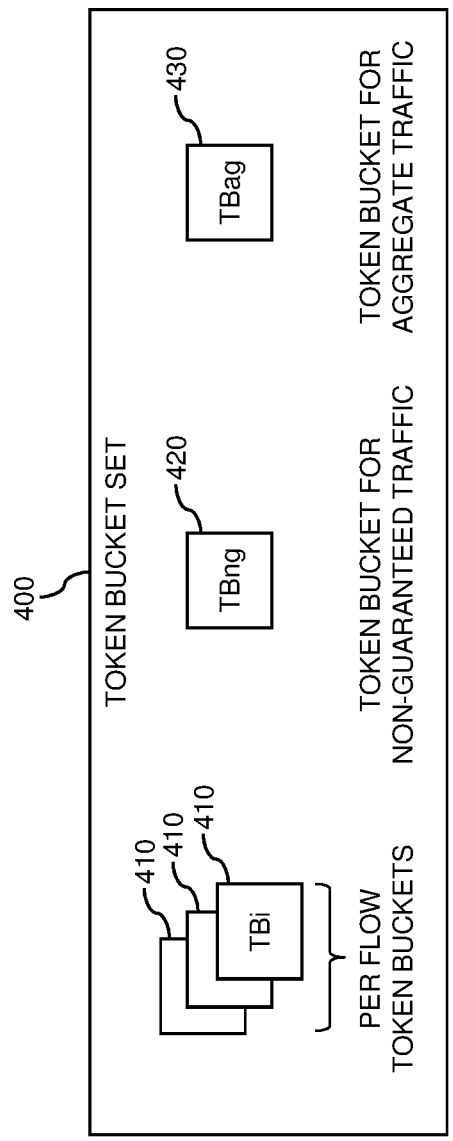
FIG. 4 schematically illustrates a set of token buckets as utilized according to an embodiment of the invention.

FIG. 4 shows an example of a set 400 of token buckets 410, 420, 430 which could be used in the input filter 310 and/or in the interleaved shaper. As illustrated, the set 400 includes per flow buckets 410, denoted as TBi, where i is an index of the corresponding flow. The per flow token buckets 410 include one token bucket 410 per flow of the data traffic forwarded by the network node 120. Further, the set includes a token bucket 420 for non-guaranteed traffic, denoted as TBng. The token bucket 420 for non-guaranteed traffic may be used for managing resources which are dedicated to be used for forwarding the non-guaranteed data packets 200. For example, the token bucket 420 could be filled at a rate which corresponds to an estimated or desirable proportion of non-guaranteed data traffic to be served by the network node 120. As further detailed below, the token bucket 420 could also be used as an overflow for the per-flow token buckets 410. In this case, excess tokens which do not fit into the per-flow token buckets 410 could be collected in the token bucket 420 and the token bucket 420 thus be utilized for managing the excess resources to be used for forwarding the non-guaranteed data traffic. As further illustrated, the set 400 includes an aggregate token bucket 430, denoted as TBag. The token bucket 430 may for example be used for managing an overall resource contingent, which can for example be used as a basis for deciding whether the input filter 310 should drop a non-guaranteed data packet 200.

As mentioned above, the transmission of the non-guaranteed data packets 200 is based on the availability of sufficient excess resources on the respective redundant link, i.e., resources in excess of the minimum amount of resources to meet the guarantee for the guaranteed data packets 200. For this purpose, an extra space is added to the reserved resource contingent(s). In other words, the maximum size of the reserved resource contingent(s) is set to be larger than actually required to meet the guarantee. The increased size of the reserved resource contingent(s) is considered in the worst case calculation of the delay, thereby making sure that also with the increased size of the reserved resource contingent(s) the guarantee is still met.

Figure 5:
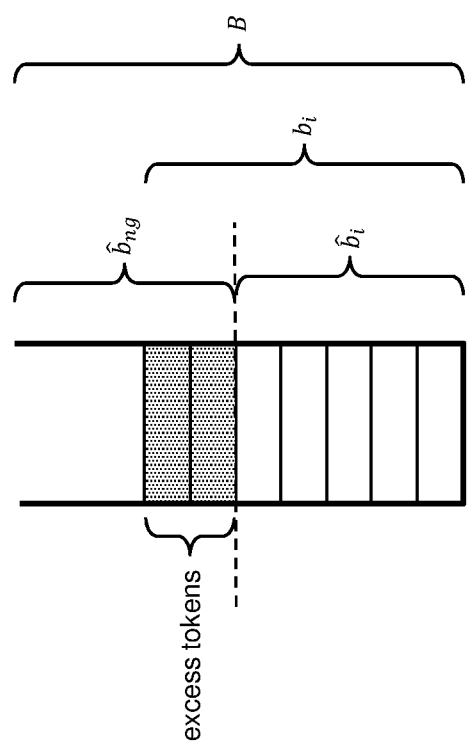
FIG. 5 shows an example of configuring a token bucket according to an embodiment of the invention.

According to one option, the extra space of the resource contingent(s) can be provided by adding an extra space to one or more of the per-flow token buckets 410. This is illustrated by FIG. 5, which shows a configuration of an exemplary token bucket. As illustrated, the token bucket has a size B. The size B is larger than a minimum size $\hat{b}_i$ required to meet the guarantee. In particular, the size B corresponds to the minimum size $\hat{b}_i$ plus an extra space denoted by $\hat{b}_{ng}$. The minimum size $\hat{b}_i$ may for example depend on the expected burstiness and/or expected maximum size of the data packets 200. Due to the increased size, the token bucket can hold excess tokens, i.e., be filled to a level $b_i$ in excess of the minimum size $\hat{b}_i$.

According to a further option, the size of one or more of the per-flow token buckets 410 may be set to the minimum size $\hat{b}_i$ required to meet the guarantee, and if these per-flow token buckets 410 are full, the overflowing tokens may be added to another token bucket, e.g., to the token bucket 420. The token bucket 420 could otherwise be configured with a fill rate of zero, i.e., only be filled with the overflowing token buckets. The token bucket 420 could thus be exclusively used for collecting excess tokens (from one or more other token buckets).

The decision whether a non-guaranteed data packet 200 can be forwarded on the basis of the available excess resources may be based on the amount of excess token buckets.

For example, when collecting the excess tokens in the extra space of the per-flow token buckets 410, the interleaved shaper 330 may decide to drop a non-guaranteed data packet 200 of size L unless the amount of excess tokens in one of the per-flow token buckets 410 exceeds the value g(PPV,L) for this data packet 200. If the amount of excess tokens in one of the per-flow token buckets 410 exceeds the value g(PPV,L), the interleaved shaper 330 may decide to forward the non-guaranteed data packet 200 using the excess tokens, i.e., taking an amount of tokens from the per-flow token bucket 410 which is given by g(PPV,L).

When collecting the excess tokens in a dedicated token bucket, e.g., in the token bucket 420, the interleaved shaper 330 may decide to drop a non-guaranteed data packet 200 of size L unless the amount of excess tokens in this token bucket exceeds the value g(PPV,L) for this data packet 200. If the amount of excess tokens in one of the per-flow token buckets 410 exceeds the value g(PPV,L), the interleaved shaper 330 may decide to forward the non-guaranteed data packet 200 using the excess tokens, i.e., taking an amount of tokens from the per-flow token bucket 410 which is given by g(PPV,L).

Figure 6:
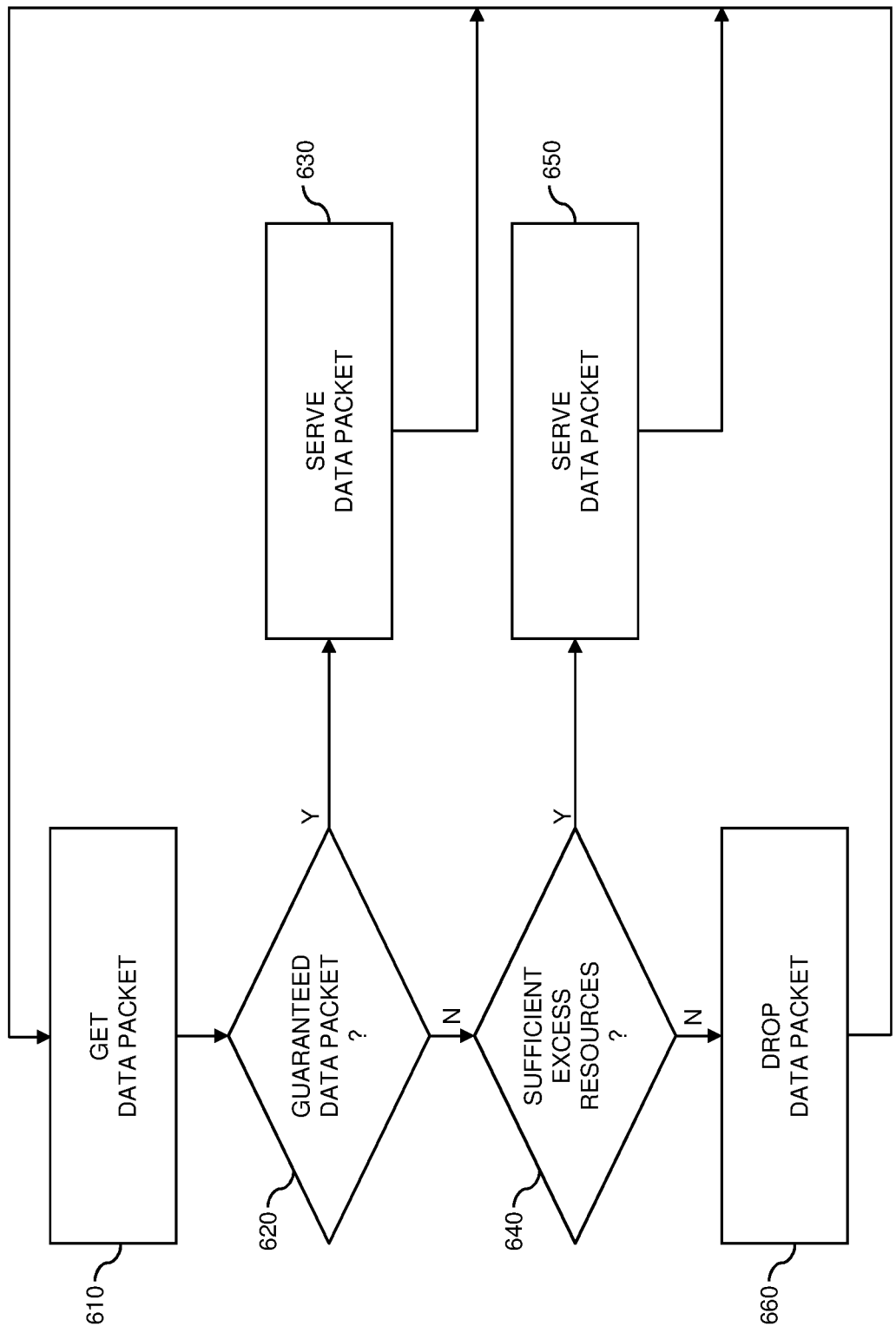
FIG. 6 shows a flowchart for schematically illustrating a method of controlling forwarding of data packets according to an embodiment of the invention.

FIG. 6 shows a flowchart for illustrating a method of controlling forwarding of data packets in a data network. The method of FIG. 6 may be utilized for implementing the transmission of the data packets on one of the redundant links, e.g., by the source node 110 or by one of the forwarding nodes 120. For example, the method could be implemented by a scheduler of the node, such as the above-mentioned scheduler 115, 125. If a processor-based implementation of the node is used, the steps of the method may be performed by one or more processors of the node. In such a case the node may further comprise a memory in which program code for implementing the below described functionalities is stored.

In the method of FIG. 6, it is assumed that the data packets to be transmitted by the node can each be a guaranteed data packet which is subject to a guarantee that the data packet is not dropped and not delayed by more than a certain delay limit or a non-guaranteed data packet which is not subject to the guarantee. Further, it is assumed that the transmission of the data packets on the redundant link is based on one or more resource contingents configured with a maximum amount of resources which is more than a minimum amount of resources required to meet the guarantee. The maximum size is configured on the basis of a worst case calculation of a delay experienced by a data packet forwarded by the node. The node assigns resources to the resource contingent and identifies resources in excess of the minimum amount as excess resources. The maximum size of the resource contingent is configured based on a worst case calculation of a delay experienced by a data packet forwarded by the node.

The resource contingent may be managed on the basis of a token bucket, e.g., one of the above-mentioned token buckets 410, 420, 430. The node may then assign resources to the resource contingent by adding tokens to the token bucket. A size of the token bucket may then correspond to the maximum amount of resources of the resource contingent, e.g., as illustrated in the example of FIG. 5.

The token bucket may also be configured with a size corresponding to the minimum amount of resources required to meet the guarantee. In this case, a further token bucket may be configured for the excess resources and the node may add tokens to the further token bucket only if the token bucket is full. In other words, the further token bucket may be used for receiving overflowing tokens from the token bucket.

In some scenarios, the received data packets may be part of multiple flows. In this case a corresponding resource contingent with a maximum amount of resources which is more than a minimum amount of resources required to meet the guarantee may be configured for each of the flows. The node may then assign resources to the corresponding resource contingent and identifies resources in excess of the minimum amount (in any of the different contingents) as excess resources.

If the received data packets are part of multiple flows the corresponding resource contingent for each of the flows may be managed on the basis of a corresponding token bucket, such as one of the above-mentioned per flow buckets 410. For each of the flows the node may then assign resources to the corresponding resource contingent by adding tokens to the corresponding token bucket. For each of the flows a size of the corresponding token bucket may corresponds to the maximum amount of resources of the corresponding resource contingent, e.g., as illustrated in the example of FIG. 5.

In some scenarios, the corresponding token bucket for each of the flows may also be configured with a size corresponding to the minimum amount of resources required to meet the guarantee. In this case, a further token bucket may be configured for the excess resources and the node may add tokens to the further token bucket only if one of the corresponding token buckets of the resource contingents for the flows is full. Accordingly, the further token bucket may be used for receiving overflowing tokens from the other token buckets. For example, the above-mentioned token bucket 420 could be used for receiving overflowing token buckets from the above-mentioned per flow token buckets 410.

At step 610, the node may get a data packet to be transmitted on the redundant link. For example, node may get the data packet, e.g., one of the above-mentioned data packets 200, from an interface with respect to another node of the data network or from a queue in which the data packet is temporarily stored.

At step 620, the node determines whether the data packet is a guaranteed data packet which is subject to a guarantee that the data packet is not dropped and not delayed by more than a certain delay limit or a non-guaranteed data packet which is not subject to the guarantee. In the example of FIG. 6, the node determines whether the data packet is a guaranteed data packet, as indicated by branch "Y". If this is not the case, the node determines that the data packet is a non-guaranteed data packet, as indicated by branch "N".

In some scenarios, each of the data packets received by the node is marked with a value, e.g., the above-mentioned PPV. The node may then determine depending on the value whether the data packet is a guaranteed data packet or a non-guaranteed data packet, e.g., by comparing the value to a threshold. For example, if the value is above the threshold the node may determine that the data packet is a guaranteed data packet.

The determination of step 620 may also depend on a size of the data packet. For example, the value marking the packet may be treated as a value per bit of the data packet, i.e., the value could be proportional to the size of the data packet.

If the data packet is found to be a guaranteed data packet, the node may proceed to step 630 and serve the guaranteed data packet. This may involve forwarding the guaranteed data packet based on the resources from the resource contingent. In some cases, the node may wait with the forwarding until sufficient resources are available in the resource contingent. In some cases, the node may also wait with the forwarding to ensure that outgoing flows of the data packets are well formed. In this way, it can be avoided that the flows become excessively bursty, which would make it more difficult to meet hop-by-hop delay requirements later in the forwarding chain. If there are multiple flows with corresponding resource contingents, the node may forward the data packet based on based on the resources in the resource contingent corresponding to the flow the data packet is part of. From step 630, the node may return to step 610 to proceed with getting a next data packet.

If the data packet is found to be a non-guaranteed data packet, the node may proceed to step 640 and check if sufficient excess resources are available for forwarding the non-guaranteed data packet.

In some scenarios, each of the data packets received by the node is marked with a value, e.g., the above-mentioned PPV. The node may then determine depending on the value whether the sufficient excess resources are present. For example, the above-mentioned function g(PPV,L) or f(PPV, L) may be applied to check whether sufficient excess tokens are available.

If sufficient excess tokens are found to be available at step 640, as indicated by branch "Y", the node may proceed to step 650 and serve the non-guaranteed data packet by forwarding the non-guaranteed data packet based on the excess resources. Since in this case the non-guaranteed data packet can be forwarded without significant further delay, it is forwarded within the same delay limit as defined for the guaranteed data packet. Accordingly, even though the data packet is non-guaranteed, it may benefit from the guaranteed delay limit. From step 650, the node may return to step 610 to proceed with getting a next data packet.

If no sufficient excess tokens are found to be available at step 640, as indicated by branch "N", the node may proceed to step 660 and drop the non-guaranteed data packet. From step 660, the node may return to step 610 to proceed with getting a next data packet.

In some scenarios, each of the data packets received by the node is marked with a value, e.g., the above-mentioned PPV. In response to determining that the data packet is a non-guaranteed data packet, the node may then also decide depending on the value whether to drop the data packet. For example, this decision could be part of input filtering of the received data packets, before storing the data packets in a queue, such as the queue 320.

In the following, it will be further explained how the replication and transmission of the data packets on the different redundant links is managed. In the illustrated concepts, this involves classifying the data packets into at least two classes and marking the replicated versions of data packets to indicate whether the data packets is to be treated as a guaranteed data packet or as a non-guaranteed data packet. The classification may for example distinguish between a first class of data traffic which to which loss or excessive delay of a data packet is very critical and at least one second class of data traffic which to which loss or excessive delay of a data packet is less critical. The marking of the data packets may use the above-mentioned PPV, e.g., a high PPV and a medium PPV to indicate that the data packet is to be treated as a guaranteed data packet and a low PPV to indicate that the data packet is to be treated as a non-guaranteed data packet.

For transmission on the redundant links, the marking of the redundant versions of the data packets depends on the class of the data packet. For the very critical class, all redundant versions are marked with the high PPV. The data packets of this class are thus treated as guaranteed data packets on each redundant link. For the less critical class, at least one redundant version is marked with the medium PPV and at least one other redundant version is marked with the low PPV. Accordingly, for this class at least one redundant version of the data packet is treated as non-guaranteed data packet and might be dropped during transmission on the redundant link.

By the above class dependent treatment of redundant versions of a data packet as either a guaranteed data packet or as a non-guaranteed data packet, efficient utilization of the capacity offered by the redundant links can be achieved. In particular, the required overall capacity as compared to a solution where all redundant versions of the data packet are treated in the same way. When all redundant links are up, transmission with bounded delay and no losses can be achieved for all classes. When a redundant link is down, transmission with bounded delay and no losses can still be achieved for the very critical class. By using the excess resources for transmission of the non-guaranteed data packets, it is then still possible to achieve bounded delay for the data packets of the less critical class(es), although lossless-ness would not be guaranteed anymore. By using the PPV for marking the redundant versions of the data packets, it is further possible to define a precedence order for dropping data packets of the less critical class(es). The possibility of losing data packets of the less critical class(es) may further be taken into account when performing error detection, e.g., in the recovery module 135 of FIG. 1. In particular, error detection may be performed by considering only the data packets marked with the high PPV, which are always treated as guaranteed data packets. If the replication based transmission on the redundant links is based on the mechanisms as defined in IEEE P802.1CB™/D2.6, the latent error detection function as described in 7.4.4 of IEEE P802.1CB™/ D2.6 may be configured to take into account the possibility of losing low PPV packets. This may achieved by considering only high PPV packets in the error detection function.

Figure 7:
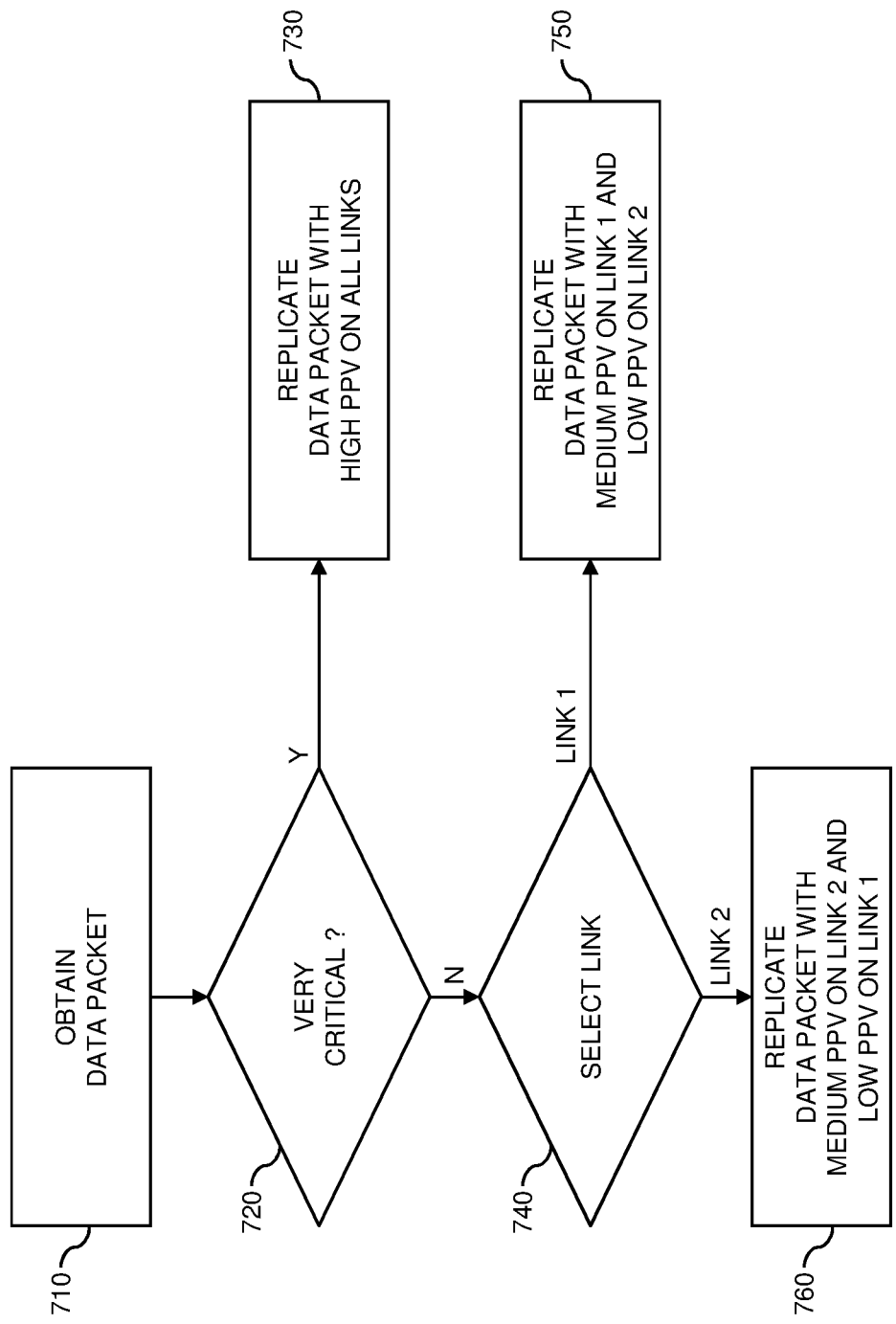
FIG. 7 shows a flowchart for schematically illustrating a method of replicating data packets according to an embodiment of the invention.

In the following, the replication based transmission on redundant links will be further explained with reference to a method as illustrated by FIG. 7 and assuming a scenario in which the data traffic is classified into two classes, a first class of data traffic to which loss of data packets and excessive delay of data packets is very critical, and a second class of data traffic, to which loss of data packets is less critical than for the data traffic of the first class. The illustrated example further assumes that two redundant links, i.e., a first redundant link and a second redundant link, are configured for the transmission of the data traffic, e.g., corresponding to LINK 1 and LINK 2 as illustrated in FIG. 1. The method of FIG. 7 may for example be implemented by the source node 110, e.g., by the scheduler 115.

At step 710, a data packet to be transmitted is obtained. The data packet may for example be received from another node of the data network or be generated locally. The data packet may be part of a certain flow or subflow and correspond to a certain traffic type, e.g., realtime traffic, such as realtime audio data or realtime video data.

At step 720, the data packet is classified. This involves determining whether the data packet corresponds to the first class of data traffic, i.e., to the very critical class, or to the second class of data traffic, i.e., to the critical class. This determination may for example be based on protocols used in the data packet or on a service type associated with the data packet.

If at step 720 the data packet is classified into the very critical class, the method proceeds to step 730, as illustrated by branch "Y". At step 730, the data packet is replicated for transmission on the two redundant links. As a result of the replication, a first replicated version of the data packet is obtained for transmission on the first redundant link, and a second replicated version of the data packet is obtained for transmission on the second redundant link. In accordance with the data packet being classified into the very critical class, both replicated versions are marked with the high PPV. Accordingly, during transmission on the respective redundant link, both replicated versions will be treated as a guaranteed data packet.

If at step 720 the data packet is classified into the critical class, one of the redundant links is used for transmitting the data packet as a guaranteed data packet while the other redundant link is used for transmitting the data packet as a non-guaranteed data packet. In this case, the method proceeds to step 740, as illustrated by branch "N". At step 740, one of the two redundant links is selected to be used for transmission of the data packet as a guaranteed data packet. This selection may be accomplished in various ways.

According to a first option, if the data packet is identified as being part of a certain flow or subflow, the redundant link may be selected depending on the flow, with the aim of allocating all data packets of the identified flow or subflow to the same redundant link. According to a second option, the redundant link may be selected on the basis of a round-robin scheduling scheme applied for distributing the data packets to be transmitted as a guaranteed data packet with substantially equal load to both redundant links. The second option may for example be applied if the data packets to be transmitted as guaranteed data packets are of substantially equal size. According to a third option, the redundant link may be selected depending on resources available on the redundant links. For example, a resource contingent for a certain flow may be reserved on both redundant links, and the redundant link which has more resources available in its resource contingent may be selected for the transmission of the data packet. As explained above, such resource contingent may be based on a token bucket.

If at step 740, the first link is selected, the method proceeds to step 750, as illustrated by branch "LINK 1". At step 750, the data packet is replicated for transmission on the two redundant links. As a result of the replication, a first replicated version of the data packet is obtained for transmission on the first redundant link, and a second replicated version of the data packet is obtained for transmission on the second redundant link. The first replicated version of the data packet is marked with the medium PPV. The second replicated version of the data packet is marked with the low PPV. Accordingly, during transmission on the first redundant link, the first replicated version will be treated as a guaranteed data packet, while during transmission on the second redundant link, the second replicated version will be treated as a non-guaranteed data packet.

If at step 740, the second link is selected, the method proceeds to step 760, as illustrated by branch "LINK 2". At step 760, the data packet is replicated for transmission on the two redundant links. As a result of the replication, a first replicated version of the data packet is obtained for transmission on the first redundant link, and a second replicated version of the data packet is obtained for transmission on the second redundant link. The first replicated version of the data packet is marked with the low PPV. The second replicated version of the data packet is marked with the medium PPV. Accordingly, during transmission on the first redundant link, the first replicated version will be treated as a non-guaranteed data packet, while during transmission on the second redundant link, the second replicated version will be treated as a guaranteed data packet.

It is noted that the marking with the PPV values at steps 730, 750, and 760 may be based on using one high PPV, one medium PPV, and one low PPV. However, it is also possible to select the high PPV from a high PPV range, to select the medium PPV from a medium PPV range, and/or select the low PPV from a low PPV range. Accordingly, different high PPVs, different medium PPVs, and/or different low PPVs could be utilized depending on the individual importance level of the data packet.

The above-described configuration of the resource contingents for each of the redundant links may be accomplished on the basis of the expected amount of data packets to be treated as guaranteed data packet, i.e., redundant versions marked with the high PPV or medium PPV. This may also take into account how the data packets marked with the medium PPV are allocated to the redundant links. For example, if a certain flow of the data packets marked with the medium PPV is allocated to one of the redundant links, a corresponding expected amount of data packets to be treated as guaranteed data packet may be taken into account when configuring the resource contingent for this redundant link. If a certain flow of the data packets marked with the medium PPV is distributed to both redundant links, e.g., using a round-robin scheduling mechanism or depending on the availability of resources on the redundant links, a corresponding expected amount of data packets to be treated as guaranteed data packet may be taken into account when configuring the resource contingent of both redundant links, typically with the assumption that one half of the expected traffic load would be transmitted on the first redundant link and the other half of the expected traffic load would be transmitted on the second redundant link. As compared to a situation where the flow is allocated to one of the redundant links, a token bucket for the flow may be configured for each of the redundant links, however with half of the size and half of the fill rate.

Accordingly, the redundant links may be configured with a capacity which is dimensioned for the expected load of data packets marked with the high PPV and the medium PPV packets, with the aim of guaranteeing that these data packets are not lost or delayed beyond the defined delay limit. Because for any data packet a replicated version with at least medium PPV is transmitted on at least one of the redundant links, it can be ensured that the guarantee can be met not only for the very critical class, but also for the critical class, as long as all the redundant links are operational. If one of the redundant links is down, the guarantee can still be met for the very critical class. For the critical class, the delay limit can still be guaranteed, but loss of a data packet might occur. However, also such risk of a data packet of the critical class being lost can be limited since the available excess resources on the operational redundant link may be used for transmission of the non-guaranteed data packets.

It is noted that the above-described concepts may also be generalized to scenarios with more than two redundant links and more than two classes of traffic. Typically, for each additional redundant link, one more class can be supported. For example, in a scenario with three redundant links, three different classes of data traffic could be supported in the following way: Each data packet is classified into either a first class of data traffic to which loss of data packets and excessive delay of data packets is very critical, and a second class of data traffic, to which loss of data packets is less critical than for the data traffic of the first class, or to a third class of data traffic, to which loss of data packets is less critical than for the data traffic of the first class and of the second class. Replication is performed to obtain three replicated versions of each data packets, one for each of the three redundant links. For data packets of the first class, all redundant versions are marked with the high PPV. For the data packets of the second class, two redundant versions are marked with the medium PPV and one redundant version is marked with the low PPV. For the data packets of the third class, one redundant version is marked with the medium PPV and two redundant versions are marked with the low PPV. Accordingly, the number of redundant versions marked with the medium PPV increases with the criticality level of the class, which allows for achieving lower risk of packet losses as the criticality level increases. In the above example with three classes and three redundant links, the guarantee of data packets not being lost and not delayed beyond the delay limit can be met for all classes if all three redundant links are operational. If only two of the redundant links are operational, the guarantee can still be met for the first class and the second class. In this situation, the risk of a data packet of the third class being lost can be limited since the available excess resources on the operational redundant link may be used for transmission of the non-guaranteed data packets. If only one of the redundant links is operational, the guarantee can still be met for the first class. In this situation, the risk of a data packet of the second or third class being lost can be limited since the available excess resources on the operational redundant link may be used for transmission of the non-guaranteed data packets.

It is noted that while the above examples focused on protection with respect to loss or excessive delay of data packets, it would also be possible to achieve protection with respect to corruption of data packets. For example, if replicated versions of a certain data packet are received from more than one redundant link and one of the replicated versions is corrupt, there is still a chance that another received replicated version is not corrupt, which may be considered in the recovery processes, e.g., by discarding the corrupted replicated version and keeping the non-corrupted replicated version.

Figure 8:
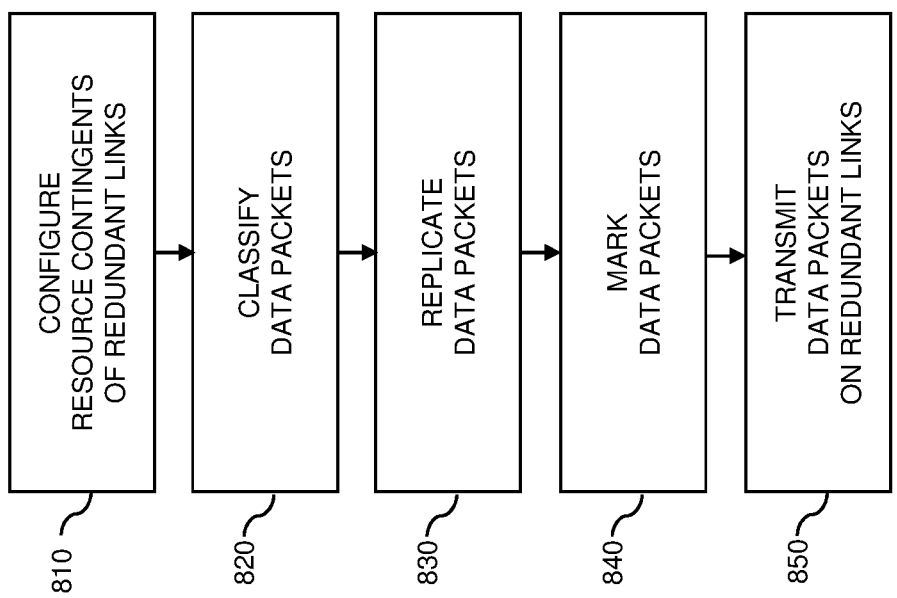
FIG. 8 shows a method of handling data traffic according to an embodiment of the invention.

FIG. 8 shows a flowchart for illustrating a method of handling data traffic in a data network. The method of FIG. 8 may be utilized for implementing the illustrated concepts in a node of the data network, such as the above-mentioned network node 110. If a processor-based implementation of the node is used, the steps of the method may be performed by one or more processors of the node. In such a case the node may further comprise a memory in which program code for implementing the below described functionalities is stored.

In the method of FIG. 8, it is assumed that data packets are transmitted on multiple redundant links on which each transmitted data packet can be treated either as a guaranteed data packet which is subject to a guarantee that the data packet is not dropped and not delayed by more than a certain delay limit or as a non-guaranteed data packet which is not subject to the guarantee, e.g., by handling the data packet as explained in connection with FIGS. 3 to 6. The transmission on the multiple redundant links may for example be based on frame replication as specified in IEEE P802.1CB™/D2.6.

At step 810, the node may configure a corresponding resource contingent for each of the redundant links. This may be accomplished based on a worst case calculation of a delay experienced by a data packet on the redundant link. The resource contingent may be configured with a maximum amount of resources which is more than a minimum amount of resources required to meet the guarantee. On each of the redundant links, the non-guaranteed data packets may then be transmitted based on excess resources in excess of the minimum amount required to meet the guarantee, e.g., as explained in connection with FIGS. 3 to 6.

At step 820, the node classifies the data packets into multiple different classes. The number of the different classes may correspond to the number of redundant links configured for the transmission of the data packets. The classes may for example differ with respect to criticality of the data traffic with respect to loss of a data packet.

At step 830, the node replicates the data packets according to the number of redundant links configured for transmission of the data packets. As a result, the node obtains, for each of the redundant links, a redundant version of the data packets. By way of example, if the number of redundant links is two, the replication would provide two redundant versions of each data packet, and if the number of redundant links is three, the replication would provide three redundant versions of each data packet. The replication of the data packets may for example be implemented by a stream splitting function as described in section 7.7 of IEEE P802.1CB™/D2.6.

At step 840, the node marks the data packets depending on the class determined at step 810. For a first one of the classes, the node marks all redundant versions of the data packets with a first indication that the data packet is a guaranteed data packet. For a second one of the classes, the node marks at least one of the redundant versions of the data packets with a second indication that the data packet is a guaranteed data packet which is subject to the guarantee, while the node marks at least one other of the redundant versions of the data packet with a third indication that the data packet is a non-guaranteed data packet which is not subject to the guarantee. Accordingly, in the case of the second one of the classes, redundant versions of the same data packet are marked differently.

The first indication, second indication, and third indication may correspond to values representing an individual importance level of the data packet, such as the above mentioned PPV. As illustrated in FIG. 2B, the PPV may provided in a field of redundancy tag information, e.g., as described in section 7.8 of IEEE P802.1CB™/D2.6. The first indication may correspond to a value from a first range, the second indication may correspond to a value from a second range, and the third indication may correspond to a value from a third range. By comparing the value of the data packet to one or more thresholds, a node which forwards the data packet can determine whether to treat the data packet as a guaranteed data packet are as a nonguaranteed data packet. Within the first range, second range, or third range the respective value may differ between individual data packets, even if these data packets are classified into the same class.

In some scenarios, if the number of redundant links is three or more, the classes may include multiple second classes which differ with respect to a number of the redundant versions for which the data packets are marked with the second indication and/or a number of the redundant versions for which the data packets marked with the third indication.

At step 850, the node may then transmit the marked redundant versions of the data packets on the multiple redundant links. For this purpose, the node may schedule the transmissions on each of the redundant links using mechanisms as described in connection with FIGS. 3 to 6.

In some scenarios, the node may allocate a flow of the data packets marked with the second indication to a corresponding one of the redundant links. In this case, the data packets of the same flow would all be transmitted on the same redundant link.

In some scenarios, for a flow of the data packets marked with the second indication, the node may distribute the data packets of the flow to at least two of the redundant links, e.g., according to a round-robin scheduling scheme or according to resources available on the at least two of the redundant links.

In some scenarios, for each of the redundant links a corresponding resource contingent may be configured based on a worst case calculation of a delay experienced by a data packet on the redundant link. The resource contingent may be configured with a maximum amount of resources which is more than a minimum amount of resources required to meet the guarantee. On each of the redundant links, the non-guaranteed data packets may then be transmitted based on excess resources in excess of the minimum amount required to meet the guarantee, e.g., as explained in connection with FIGS. 3 to 6.

Among the data packets which are then received from the multiple redundant links, replicated versions of previously received data packets may be discarded. Errors in the transmission of the data packets on the multiple redundant links may be detected by monitoring the data packets marked with the first indication, disregarding the data packets marked with the second indication and the data packets marked with the third indication.

Figure 9:
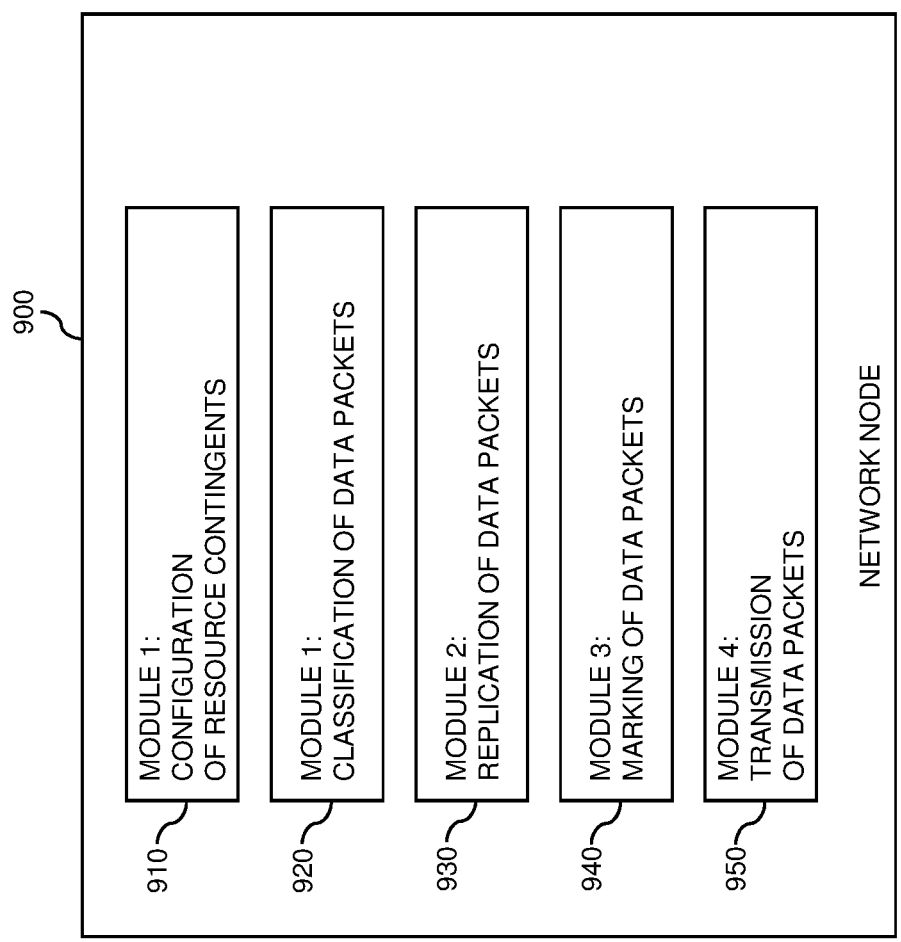
FIG. 9 shows a block diagram for illustrating functionalities of a network node according to an embodiment of the invention.

FIG. 9 shows a block diagram for illustrating functionalities of a network node 900 which operates according to the method of FIG. 8. As illustrated, the network node 900 may optionally be provided with a module 910 configured to configure resource contingents for transmission of data packets on multiple redundant links, such as explained in connection with step 810. Further, the network node 900 may be provided with a module 920 configured to classify the data packets, such as explained in connection with step 820. Further, the network node 900 may be provided with a module 930 configured to replicate the data packets to obtain a redundant version for each redundant link, such as explained in connection with step 830. Further, the network node 900 may be provided with a module 940 configured to mark the redundant versions of the data packets depending on the class of the data packet, such as explained in connection with step 840. Further, the network node 900 may optionally be provided with a module 950 configured to transmit the data packets on the multiple redundant links, such as explained in connection with step 850.

It is noted that the network node 900 may include further modules for implementing other functionalities, such as known functionalities of switch or gateway for a data network. Further, it is noted that the modules of the network node 900 do not necessarily represent a hardware structure of the network node 900, but may also correspond to functional elements, e.g., implemented by hardware, software, or a combination thereof.

Figure 10:
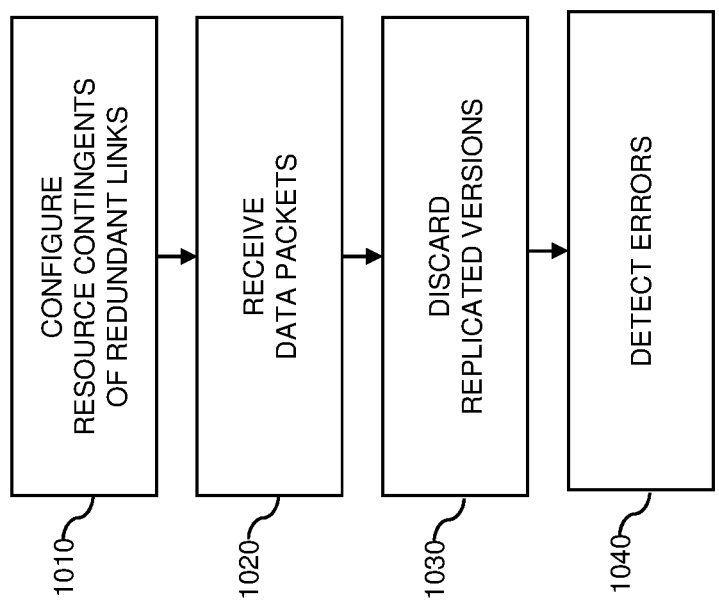
FIG. 10 shows a further method of handling data traffic according to an embodiment of the invention.

FIG. 10 shows a flowchart for illustrating a further method of handling data traffic in a data network. The method of FIG. 10 may be utilized for implementing the illustrated concepts in a node of the data network, such as the above-mentioned network node 130. If a processor-based implementation of the node is used, the steps of the method may be performed by one or more processors of the node. In such a case the node may further comprise a memory in which program code for implementing the below described functionalities is stored.

In the method of FIG. 10, it is assumed that data packets are transmitted on multiple redundant links on which each transmitted data packet can be treated either as a guaranteed data packet which is subject to a guarantee that the data packet is not dropped and not delayed by more than a certain delay limit or as a non-guaranteed data packet which is not subject to the guarantee, e.g., by handling the data packet as explained in connection with FIGS. 3 to 6. The transmission on the multiple redundant links may for example be based on frame replication as specified in IEEE P802.1CB™/D2.6.

At step 1010, the node may configure a corresponding resource contingent for each of the redundant links. This may be accomplished based on a worst case calculation of a delay experienced by a data packet on the redundant link. The resource contingent may be configured with a maximum amount of resources which is more than a minimum amount of resources required to meet the guarantee. On each of the redundant links, the non-guaranteed data packets may then be transmitted based on excess resources in excess of the minimum amount required to meet the guarantee, e.g., as explained in connection with FIGS. 3 to 6. It is noted, that in some scenarios the configuration of the resource contingents may also be performed by some other node, e.g., another node involved in the transmission of the data packets on the redundant links or a separate link management node.

At step 1020, the node receives the data packets from the multiple redundant links. On each of the redundant links, the data packets may have been transmitted using mechanisms as described in connection with FIGS. 3 to 6.

The received data packets have been classified into multiple different classes. The number of the different classes may correspond to the number of redundant links configured for the transmission of the data packets. The classes may for example differ with respect to criticality of the data traffic with respect to loss of a data packet. Further, the data packets have been replicated according to the number of redundant links configured for transmission of the data packets, to obtain a redundant version of the data packets for each of the redundant links. By way of example, if the number of redundant links is two, the replication would provide two redundant versions of each data packet, and if the number of redundant links is three, the replication would provide three redundant versions of each data packet. The replication of the data packets may for example be implemented by a stream splitting function as described in section 7.7 of IEEE P802.1CB™/D2.6. Further, the data packets have been marked according to their class. For a first one of the classes, all redundant versions of the data packets are marked with a first indication that the data packet is a guaranteed data packet. For a second one of the classes, at least one of the redundant versions of the data packets is marked with a second indication that the data packet is a guaranteed data packet which is subject to the guarantee, while at least one other of the redundant versions of the data packet is marked with a third indication that the data packet is a non-guaranteed data packet which is not subject to the guarantee. Accordingly, in the case of the second one of the classes, redundant versions of the same data packet are marked differently.

The first indication, second indication, and third indication may correspond to values representing an individual importance level of the data packet, such as the above mentioned PPV. As illustrated in FIG. 2B, the PPV may provided in a field of redundancy tag information, e.g., as described in section 7.8 of IEEE P802.1CB™/D2.6. The first indication may correspond to a value from a first range, the second indication may correspond to a value from a second range, and the third indication may correspond to a value from a third range. By comparing the value of the data packet to one or more thresholds, a node which forwards the data packet can determine whether to treat the data packet as a guaranteed data packet are as a nonguaranteed data packet. Within the first range, second range, or third range the respective value may differ between individual data packets, even if these data packets are classified into the same class.

In some scenarios, a flow of the data packets marked with the second indication may be allocated to a corresponding one of the redundant links. In this case, the data packets of the same flow would all be received from the same redundant link.

In some scenarios, for a flow of the data packets marked with the second indication, the data packets of the flow may be distributed to at least two of the redundant links, e.g., according to a round-robin scheduling scheme or according to resources available on the at least two of the redundant links.

In some scenarios, if the number of redundant links is three or more, the classes may include multiple second classes which differ with respect to a number of the redundant versions for which the data packets are marked with the second indication and/or a number of the redundant versions for which the data packets marked with the third indication.

At step 1030, the node discards replicated versions of previously received data packets among the received data packets. In this way, the node may remove the redundancy introduced into the data traffic in order to achieve enhanced reliability. If the replication based transmission on the redundant links is based on the mechanisms as defined in IEEE P802.1CB™/D2.6, the discarding of replicate among the received data packets may be accomplished by a sequence recovery function as described in 7.4.2 of IEEE P802.1CB™/D2.6.

At step 1040, the node detects errors in the transmission of the data packets on the multiple redundant links may be detected by monitoring the data packets marked with the first indication, disregarding the data packets marked with the second indication and the data packets marked with the third indication. If the replication based transmission on the redundant links is based on the mechanisms as defined in IEEE P802.1CB™/D2.6, the discarding of replicate among the received data packets may be accomplished by a latent error detection function as described in 7.4.4 of IEEE P802.1CB™/D2.6.

Figure 11:
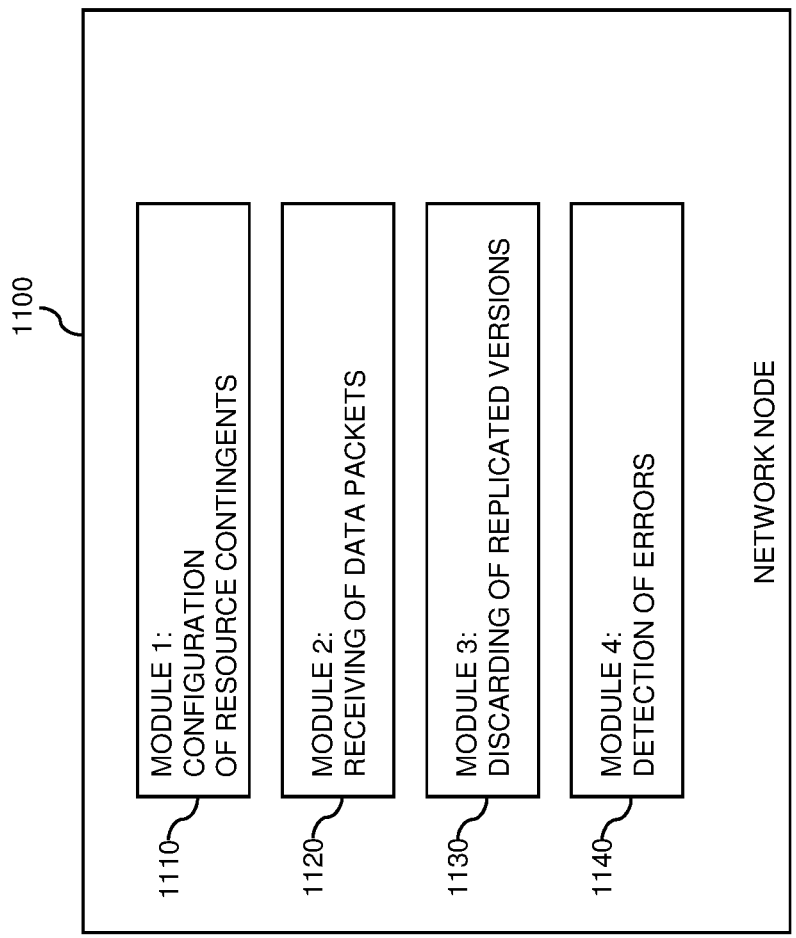
FIG. 11 shows a block diagram for illustrating functionalities of a network node according to an embodiment of the invention.

FIG. 11 shows a block diagram for illustrating functionalities of a network node 1100 which operates according to the method of FIG. 10. As illustrated, the network node 1100 may optionally be provided with a module 1110 configured to configure resource contingents for transmission of data packets on multiple redundant links, such as explained in connection with step 1010. Further, the network node 1100 may be provided with a module 1120 configured to receive the data packets, such as explained in connection with step 1020. Further, the network node 1100 may be provided with a module 1130 configured to discard replicates among the received data packets, such as explained in connection with step 1030. Further, the network node 1100 may be provided with a module 1140 configured to detect errors, such as explained in connection with step 1040.

It is noted that the network node 1100 may include further modules for implementing other functionalities, such as known functionalities of switch or gateway for a data network. Further, it is noted that the modules of the network node 1100 do not necessarily represent a hardware structure of the network node 1100, but may also correspond to functional elements, e.g., implemented by hardware, software, or a combination thereof.

It is noted, that in some scenarios the configuration of the resource contingents as described in connection with steps 810 and 1010 and modules 910 and 1110 could also be performed by some other node, e.g., another node involved in the transmission of the data packets on the redundant links, such as one of the forwarding nodes 120 in FIG. 1, or by a separate link management node. Such a node might then not need to perform the other illustrated steps, e.g., steps 820, 830, 840, 850 or 1020, 1030, 1040, and would not need to be provided with the other illustrated modules, e.g., modules 920, 930, 940, 950 or 1120, 1130, 1140.

Further, it is noted that the methods of FIGS. 8 and 10 could also be combined in a system which includes a first node operating according to the method of FIG. 8 and a second node operating according to the method of FIG. 10. Further, such system could also include a separate third node which accomplishes the configuration of the links and resource contingents according to step 810 or 1010.

Figure 12:
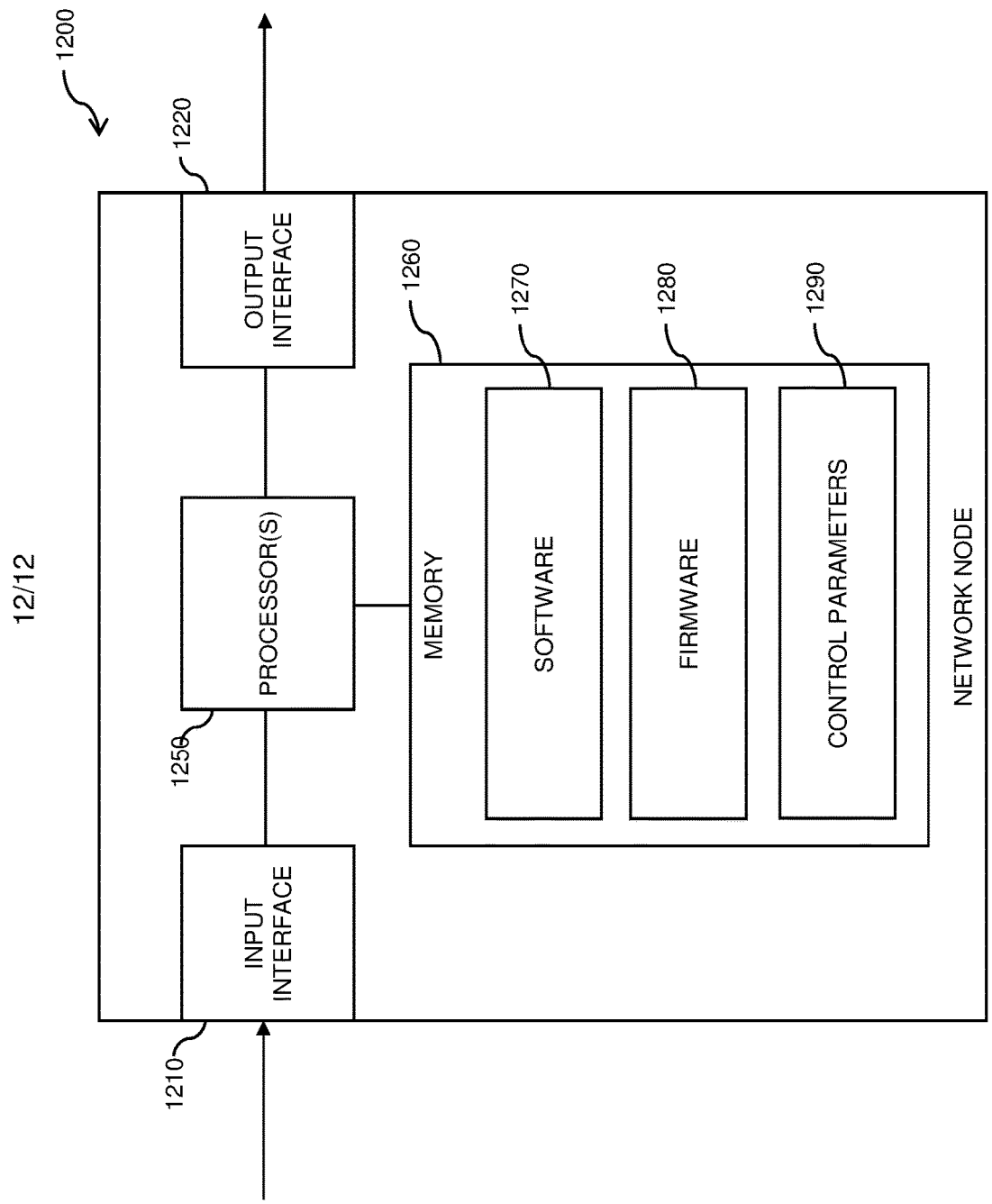
FIG. 12 schematically illustrates structures of a network node according to an embodiment of the invention.

FIG. 12 illustrates a processor-based implementation of a network node 1200 which may be used for implementing the above described concepts. The network node 1200 may for example correspond to a switch, router or gateway of the data network, or to a management node.

As illustrated, the network node 1200 includes an input interface 1210 and an output interface 1220. The input interface 1210 may be used for receiving data packets, e.g., from other nodes of the data network. The output interface 1220 may be used for transmitting the data packets, e.g., to other nodes of the data network. If the network node 1200 corresponds to a management node, the input interface 1210 and output interface 1220 could also be replaced by one or more management or control interfaces with respect to other nodes of the data network.

Further, the network node 1200 may include one or more processors 1250 coupled to the interfaces 1210, 1220 and a memory 1260 coupled to the processor(s) 1250. By way of example, the interfaces 1210, 1220, the processor(s) 950, and the memory 1260 could be coupled by one or more internal bus systems of the network node 1200. The memory 1260 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270, firmware 1280, and/or control parameters 1290. The memory 1260 may include suitably configured program code to be executed by the processor(s) 1250 so as to implement the above-described functionalities of a network node, such as explained in connection with FIGS. 8 and 10.

It is to be understood that the structures as illustrated in FIG. 12 are merely schematic and that the network node 1200 may actually include further components which, for the sake of clarity, have not been illustrated, e.g., further interfaces or processors. Also, it is to be understood that the memory 1260 may include further program code for implementing known functionalities of a network node, e.g., known functionalities of a switch, router, gateway, or management node. According to some embodiments, also a computer program may be provided for implementing functionalities of the network node 1200, e.g., in the form of a physical medium storing the program code and/or other data to be stored in the memory 960 or by making the program code available for download or by streaming.

As can be seen, the concepts as described above may be used for efficiently transmitting data traffic on multiple redundant links. In particular, by using class dependent treatment of replicated versions of the packets as either guaranteed data packets or nonguaranteed data packets, it can be achieved that packet losses are be avoided at least for one class, even if one of the redundant links is down. Further, packet losses can be avoided for all classes if all redundant links are operative.

It is to be understood that the examples and embodiments as explained above are merely illustrative and susceptible to various modifications. For example, the illustrated concepts may be applied in connection with various kinds of data networks, without limitation to the above-mentioned example of a transport network part of a wireless communication network. Further, the illustrated concepts may be applied in various kinds of nodes, including without limitation to the above-mentioned examples of a switch, router, or gateway. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method of handling data traffic in a data network, the method comprising:
   a node of the data network classifying data packets into multiple different classes;
   the node replicating the data packets according to a number of redundant links configured for transmission of the data packets to obtain, for each of the redundant links, a redundant version of the data packets;
   for a first one of the classes, the node marking all redundant versions of the data packets with a first indication that the data packet is a guaranteed data packet which is subject to a guarantee that the data packet is not dropped and not delayed by more than a certain delay limit;
   for a second one of the classes, the node marking at least one of the redundant versions of the data packets with a second indication that the data packet is a guaranteed data packet which is subject to the guarantee while marking at least one other of the redundant versions of the data packets with a third indication that the data packet is a non-guaranteed data packet which is not subject to the guarantee, wherein the first indication corresponds to a value from a first range, the second indication corresponds to a value from a second range, and the third indication corresponds to a value from a third range.

2. The method according to claim 1, comprising:
the node allocating a flow of the data packets marked with the second indication to a corresponding one of the redundant links.

3. The method according to claim 1, comprising:
for a flow of the data packets marked with the second indication, the node distributing the data packets of the flow to at least two of the redundant links.

4. The method according to claim 3,
wherein the data packets of the flow are distributed according to a round-robin scheduling scheme to the at least two of the redundant links.

5. The method according to claim 3,
wherein the data packets of the flow are distributed according to resources available on the at least two of the redundant links.

6. A method of handling data traffic in a data network, the method comprising:
a node of the data network classifying data packets into multiple different classes;
the node replicating the data packets according to a number of redundant links configured for transmission of the data packets to obtain, for each of the redundant links, a redundant version of the data packets;
for a first one of the classes, the node marking all redundant versions of the data packets with a first indication that the data packet is a guaranteed data packet which is subject to a guarantee that the data packet is not dropped and not delayed by more than a certain delay limit;
for a second one of the classes, the node marking at least one of the redundant versions of the data packets with a second indication that the data packet is a guaranteed data packet which is subject to the guarantee while marking at least one other of the redundant versions of the data packets with a third indication that the data packet is a non-guaranteed data packet which is not subject to the guarantee,
wherein the number of redundant links is three or more and the classes comprise multiple second classes which differ with respect to a number of the redundant versions for which the data packets are marked with the second indication and/or a number of the redundant versions for which the data packets marked with the third indication.

7. The method according to claim 1,
wherein for each of the redundant links a corresponding resource contingent is configured based on a worst case calculation of a delay experienced by a data packet on the redundant link.

8. A method of handling data traffic in a data network, the method comprising:
a node of the data network configuring multiple redundant links for transmission of data packets, the data packets being classified into data packets of multiple different classes and the data packets being replicated to obtain, for each of the redundant links, a redundant version of the data packets;
for each of the redundant links, the node configuring a corresponding resource contingent based on a worst case calculation of a delay experienced by a data packet on the redundant link;
wherein for a first one of the classes all redundant versions of the data packets are marked with a first indication that the data packet is a guaranteed data packet which is subject to a guarantee that the data packet is not dropped and not delayed by more than a certain delay limit;
wherein for a second one of the classes, at least one of the redundant versions of the data packets is marked with a second indication that the data packet is a guaranteed data packet which is subject to the guarantee while at least one other of the redundant versions of the data packets is marked with a third indication that the data packet is a non-guaranteed data packet which is not subject to the guarantee,
wherein for each of the redundant links the node configures the resource contingent with a maximum amount of resources which is more than a minimum amount of resources required to meet the guarantee,
wherein on each of the redundant links the non-guaranteed data packets are forwarded based on excess resources in excess of the minimum amount required to meet the guarantee, and
wherein the first indication corresponds to a value from a first range, the second indication corresponds to a value from a second range, and the third indication corresponds to a value from a third range.

9. The method according to claim 8, comprising:
wherein a flow of the data packets marked with the second indication is allocated to a corresponding one of the redundant links.

10. The method according to claim 8, comprising:
wherein for a flow of the data packets marked with the second indication the data packets of the flow are distributed to at least two of the redundant links.

11. The method according to claim 10,
wherein the data packets of the flow are distributed according to a round-robin scheduling scheme to the at least two of the redundant links.

12. The method according to claim 10,
wherein the data packets of the flow are distributed according to resources available on the at least two of the redundant links.

13. A method of handling data traffic in a data network, the method comprising:
a node of the data network receiving data packets from multiple redundant links, the data packets being classified into data packets of multiple different classes and the data packets being replicated to obtain, for each of the redundant links, a redundant version of the data packets;
among the data packets received from the multiple redundant links, the node discarding replicated versions of previously received data packets,
wherein for a first one of the classes all redundant versions of the data packets are marked with a first indication that the data packet is a guaranteed data packet which is subject to a guarantee that the data packet is not dropped and not delayed by more than a certain delay limit;
wherein for a second one of the classes, at least one of the redundant versions of the data packets is marked with a second indication that the data packet is a guaranteed data packet which is subject to the guarantee while at least one other of the redundant versions of the data packets is marked with a third indication that the data packet is a non-guaranteed data packet which is not subject to the guarantee, wherein the node detects errors in the transmission of the data packets on the multiple redundant links by monitoring the data packets marked with the first indication, and wherein the first indication corresponds to a value from a first range, the second indication corresponds to a value from a second range, and the third indication corresponds to a value from a third range.

14. The method according to claim 13,
wherein a flow of the data packets marked with the second indication is allocated to a corresponding one of the redundant links.

15. The method according to claim 13,
wherein for a flow of the data packets marked with the second indication, the data packets of the flow are distributed to at least two of the redundant links.

16. The method according to claim 15,
wherein the data packets of the flow are distributed according to a round-robin scheduling scheme to the at least two of the redundant links.

17. The method according to claim 15,
wherein the data packets of the flow are distributed according to resources available on the at least two of the redundant links.

* * * * *